United States Patent
Lee

(10) Patent No.: US 6,836,027 B2
(45) Date of Patent: Dec. 28, 2004

(54) AUXILIARY POWER CONTROL SYSTEM FOR SERIES-TYPE HYBRID ELECTRIC VEHICLE

(75) Inventor: Hyeoun-Dong Lee, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 72 days.

(21) Appl. No.: 10/331,249

(22) Filed: Dec. 30, 2002

(65) Prior Publication Data

US 2004/0021323 A1 Feb. 5, 2004

(30) Foreign Application Priority Data

Jul. 31, 2002 (KR) .................................. 2002-0045249

(51) Int. Cl.⁷ ............................ F02N 11/06; B60K 6/00; H02P 9/04
(52) U.S. Cl. .................................. 290/40 C; 180/65.2
(58) Field of Search ............................ 290/40 C, 40 R, 290/40 B; 1/40 F; 180/65.1, 65.2, 65.5

(56) References Cited

U.S. PATENT DOCUMENTS

| | | | | |
|---|---|---|---|---|
| 4,322,630 A | * | 3/1982 | Mezera et al. ............ | 290/40 C |
| 4,606,446 A | * | 8/1986 | Watanabe .................... | 477/39 |
| 5,199,912 A | * | 4/1993 | Dade et al. ................... | 440/6 |
| 5,621,304 A | * | 4/1997 | Kiuchi et al. ................ | 322/18 |
| 6,018,198 A | * | 1/2000 | Tsuzuki et al. .............. | 290/17 |
| 6,274,943 B1 | * | 8/2001 | Hasegawa et al. .......... | 290/40 C |
| 6,414,400 B1 | * | 7/2002 | Scott et al. ................... | 290/40 C |
| 6,570,265 B1 | * | 5/2003 | Shiraishi et al. ............ | 290/40 C |
| 6,683,389 B2 | * | 1/2004 | Geis .............................. | 290/40 C |
| 2002/0163199 A1 | * | 11/2002 | Ramaswamy et al. ...... | 290/40 C |
| 2004/0050598 A1 | * | 3/2004 | Saito et al. ................... | 180/65.2 |

* cited by examiner

*Primary Examiner*—Joe Waks
*Assistant Examiner*—Julio C. Gonzalez
(74) *Attorney, Agent, or Firm*—Morgan Lewis & Bockius LLP

(57) ABSTRACT

An auxiliary power control system for controlling an auxiliary power unit of a series-type hybrid electric vehicle (SHEV) of the present invention includes a DC generator, a DC/DC converter, a generator control unit, an engine control unit, and an auxiliary power unit. The DC generator is driven by an engine for generating DC power. The DC/DC converter converts the DC power generated by the DC generator to a voltage level. The generator control unit controls the voltage level of the DC generator. The engine control unit controls the engine. The auxiliary power unit controller outputs a voltage control signal to the generator control unit, and a throttle control signal to the engine control unit, such that the DC generator outputs a predetermined power.

3 Claims, 3 Drawing Sheets

US 6,836,027 B2

AUXILIARY POWER CONTROL SYSTEM FOR SERIES-TYPE HYBRID ELECTRIC VEHICLE

FIELD OF THE INVENTION

The present invention relates to a series-type hybrid electric vehicle (SHEV) and in particular, to an auxiliary power control system for an SHEV.

BACKGROUND OF THE INVENTION

A conventional SHEV includes an internal combustion engine (ICE) and an induction motor (IM) that is driven by the engine to generate AC power, which is stored in a battery array (after being converted to DC power). An auxiliary power unit (APU) manages vehicle driving power, as well as charging and discharging of the battery array at predetermined levels.

The auxiliary power unit generates a throttle control signal and a torque control signal in response to a power control signal (based on the driver's intentions) and a state of charge (SOC) signal from the battery management system (BMS). The auxiliary power unit transmits the throttle control signal to an engine control unit (ECU), and the torque control signal to a generator control unit (GCU). In the GCU, the torque control signal is decoupled into a torque current control signal and a flex current control signal, which are input to different controllers and, ultimately, to a pulse width modulation (PWM) generator and a GCU inverter.

The conventional APU control system is a multi-input multi-output (MIMO) control system generating at least two outputs, i.e., the throttle control signal and the torque control signal, and using two inputs, i.e., the power control signal and the SOC signal. The torque control signal requires additional decoupling and processing. Also, using these two type of output signals creates reliability issues, and requires the auxiliary power unit to process each unique output pair using an additional algorithm.

Additionally, because the internal combustion engine (ICE) and the induction motor (IM) must be simultaneously controlled, and because they have different operational characteristics, real-time control of the ICE and IM using these output control signals is very complex, and must often be conducted by trial-and-error.

Therefore, it would be useful to have an auxiliary power unit that can algorithmically determine a throttle control signal and a voltage control signal, whereby the voltage signal can control the speed of the DC generator directly.

SUMMARY OF THE INVENTION

In a preferred embodiment of the present invention, the auxiliary power control system for a series-type hybrid electric vehicle (SHEV) includes a DC generator, a DC/DC converter, a generator control unit, an engine control unit, and an auxiliary power unit controller. The DC generator is driven by an engine for generating DC power. The DC/DC converter converts the DC power generated by the DC generator to a voltage level. The generator control unit controls the voltage level of the DC generator. The engine control unit controls the engine. The auxiliary power unit controller outputs a voltage control signal to the generator control unit, and a throttle control signal to the engine control unit, such that the DC generator outputs a predetermined power.

Preferably, the voltage control signal and the throttle control signal are algorithmically-related. The voltage control signal and the throttle control signal may be related by a quadratic equation.

It is further preferable that the auxiliary power control system includes a vehicle control unit for outputting a power control signal to the auxiliary power unit controller.

It is also preferable that the DC/DC converter comprises a plurality of semiconductor devices. The number of semiconductor devices of the DC/DC converter is preferably four, and each semiconductor device is preferably an insulated gate bipolar transistor (IGBT).

It is further preferable that the auxiliary power unit controller outputs the voltage control signal to increase an input voltage level of the DC generator, and the throttle control signal to maintain a throttle opening at a predetermined value, when an rpm of the DC generator reaches a predetermined maximum rpm (Wmax), thereby increasing the DC generator output.

Additionally, it is preferable that the auxiliary power unit controller outputs the voltage control signal to maintain the input voltage level of the DC generator, and the throttle control signal to increase the throttle opening amount of the engine, when the rpm of the DC generator reaches a predetermined minimum rpm (Wmin), thereby increasing the rpm of the DC generator.

In yet another preferred embodiment, the present invention is a method of controlling an auxiliary power system for a hybrid electric vehicle (HEV) to change from a first operational state to a second operational state. The HEV has an engine and a DC generator. The method includes generating a first throttle control signal to increase a throttle opening of the engine, and generating a first voltage control signal to maintain an input voltage level of the DC generator.

Next, when a maximum rpm is reached, a second voltage control signal is generated to increase the input voltage level of the DC generator, and a second throttle control signal is generated to maintain the throttle opening of the engine at a first predetermined amount. When the DC generator outputs a predetermined voltage, a third throttle control signal is generated to decrease the throttle opening of the engine, and a third voltage control signal is generated to maintain the input voltage level of the DC generator.

When a minimum rpm is reached, a fourth throttle control signal is generated to increase the throttle opening of the engine to a second predetermined amount, and a fourth voltage control signal is generated to maintain the input voltage level of the DC generator. Finally, a subset of the above-outlined steps are repeated until the second operational state, comprising a predetermined rpm and a predetermined power output, is reached. The subset can be a portion or all of the aforementioned steps.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

A preferred embodiment of the present invention will be described hereinafter with reference to the accompanying drawings.

Figure 1:
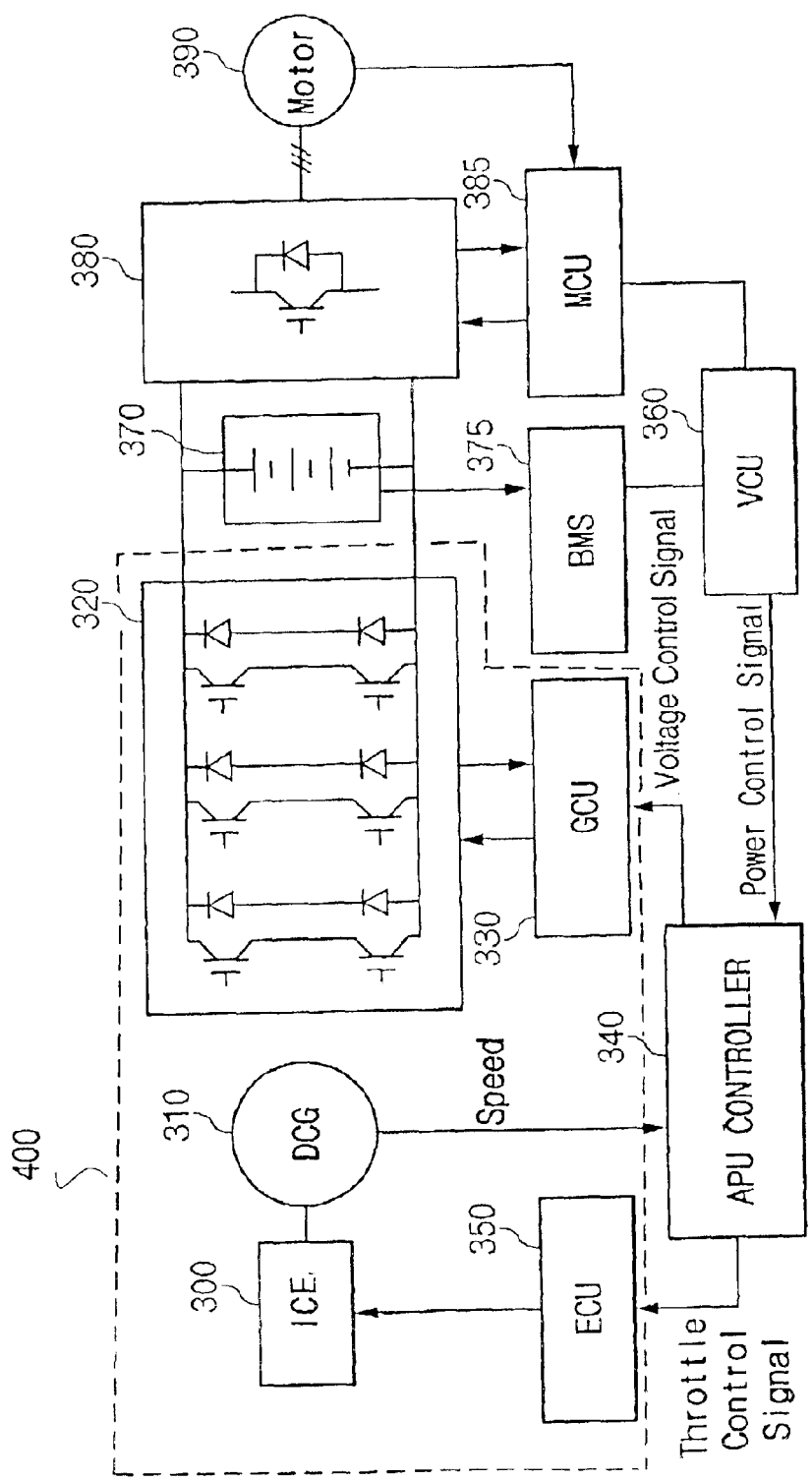
FIG. 1 is a block diagram illustrating an auxiliary power control system of a serial-type hybrid electric vehicle according to a preferred embodiment of the present invention.

Referring to FIG. 1, a structure of an auxiliary power control system of a series-type hybrid electric vehicle (SHEV) according to a preferred embodiment of the present invention is shown.

The auxiliary power control system of the SHEV according to the preferred embodiment of the present invention includes an auxiliary power unit (APU) 400 (represented by the dotted line) and an APU controller 340. The APU 400 includes: an internal combustion engine (ICE) 300; an engine control unit (ECU) 350 for controlling the ICE 300; a direct current (DC) generator 310; a DC/DC converter 320; and a generator control unit (GCU) 330. The APU controller 340 preferably includes a processor, a memory, and other necessary hardware and software components, as will be understood by persons skilled in the art, to permit the control unit to communicate with sensors and execute the control functions as described herein.

The DC generator 310 is driven by the ICE 300 to convert the mechanical power of the ICE 300 into electric energy. The DC/DC converter 320, commonly referred to as a "chopper," includes a plurality of semiconductor devices for controlling and amplifying the voltage levels of the DC power generated by the DC generator 310. The voltage control semiconductor device may be, according to one preferred embodiment, an insulated gate bipolar transistor (IGBT), and the DC/DC converter 320 can be implemented as four IGBTs.

The electric power generated by the DC generator 310 charges the battery array 370 through the DC/DC converter 320, and/or is converted into mechanical power and transferred to a drive train coupled to the drive axle of the vehicle. The transfer of the mechanical power to the drive axle occurs under cooperation of a driving motor inverter 380, a motor control unit (MCU) 385, and a driving motor 390.

As described above, by utilizing DC generator 310 and DC/DC converter 320, the auxiliary power control system according to a preferred embodiment of the present invention can reduce the number of IGBTs required. For example, in a conventional auxiliary power system, six IGBTs may be required, where only four IGBTs are utilized in this embodiment to stabilize the power supply, since the DC generator advantageously provides stability of control.

Preferably, the auxiliary power unit (APU) controller 340 of the auxiliary power control system receives a power control signal from a vehicle control unit (VCU) 360. The VCU 360 computes an output power level for the auxiliary power unit based on an accelerator pedal displacement and a state of charge (SOC) of the battery array 370, as input from the battery management system 375. The VCU 360 then generates a power control signal in accordance with the computed output power level, and transmits the power control signal to the APU controller 340.

If the power control signal is input from the vehicle control unit 360, the APU controller 340 generates a throttle control signal and a voltage control signal based on the power control signal, and on the number of revolutions per minute (rpm) of the DC generator 310.

In a preferred embodiment, the APU controller 340 generates the voltage control signal, which is used for controlling the output voltage of the DC generator 310. (Conventionally, as explained above, the GCU generates a torque control signal). The APU controller provides the voltage control signal as an input to the GCU 330 in the auxiliary power control system according to a preferred embodiment of the present invention. The GCU 330 then generates a gate signal for the DC/DC converter 320 in accordance with the voltage control signal, such that the DC/DC converter 320 controls the output of the DC generator 310 using the gate signal.

Additionally, the APU controller 340 outputs the throttle control signal to the ECU 350 for controlling the throttle opening in the internal combustion engine 300.

Figure 2:
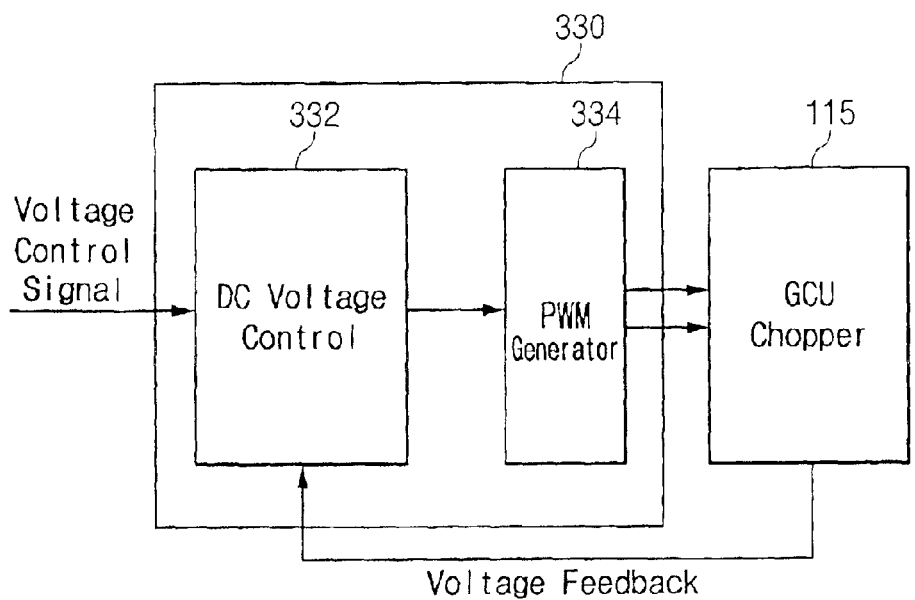
FIG. 2 is a block diagram illustrating one example of the inner construction of the generator control unit of the auxiliary power control system shown in FIG. 1.

FIG. 2 is a block diagram illustrating a generator control unit for the auxiliary power control system described above, in accordance with a preferred embodiment of the present invention. As shown, the GCU 330 includes a DC voltage controller 332 and a pulse width modulation (PWM) generator 334. The DC voltage controller 332 controls the PWM 334 in accordance with the voltage control signal input by the APU controller 340, as well as a feedback voltage signal from the DC/DC converter 320 (i.e., the "GCU Chopper 115"). In this manner, the PWM 334 produces a PWM signal for adjusting the output power level of the DC generator 310.

Referring back to FIG. 1, if the rpm of the DC generator 310 reaches a predetermined maximum rpm (Wmax), the APU controller 340 generates a throttle control signal that causes the throttle opening angle of the internal combustion engine 300 to be maintained. The APU controller also generates a voltage control signal that causes the DC generator to increase the output voltage level of the DC generator 310.

If, on the other hand, the rpm of the DC generator 310 reaches a predetermined minimum rpm (Wmin), the APU controller 340 outputs a throttle control signal that causes the throttle opening angle to increase. The APU controller also outputs a voltage control signal that causes the output voltage of the DC generator 310 to be maintained at its present level.

The operation of the auxiliary power control system of the SHEV according to the preferred embodiment of the present invention will now be described, with reference to FIGS. 3, 4, and 5.

Figure 3:
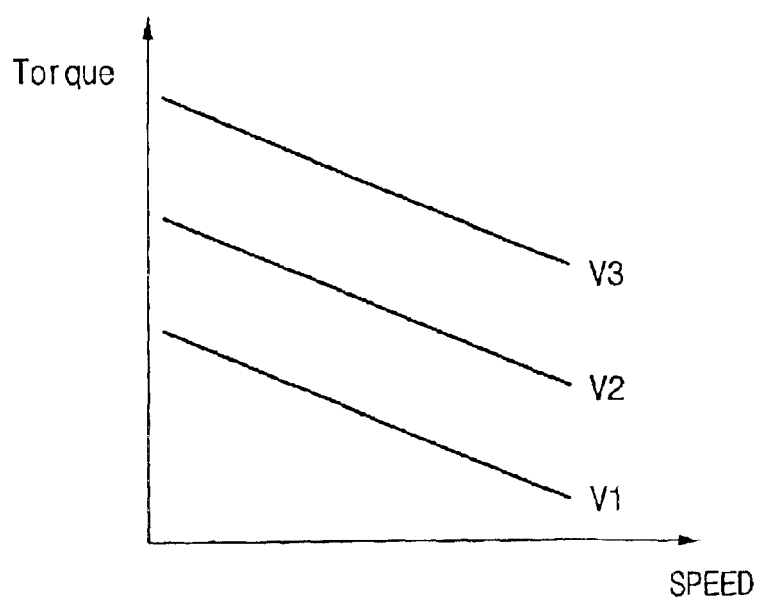
FIG. 3 is a graph illustrating speed (rpm) and output characteristics of the DC generator of FIG. 1 according to different voltage levels supplied to the DC generator, in accordance with a preferred embodiment of the present invention.
Figure 4:
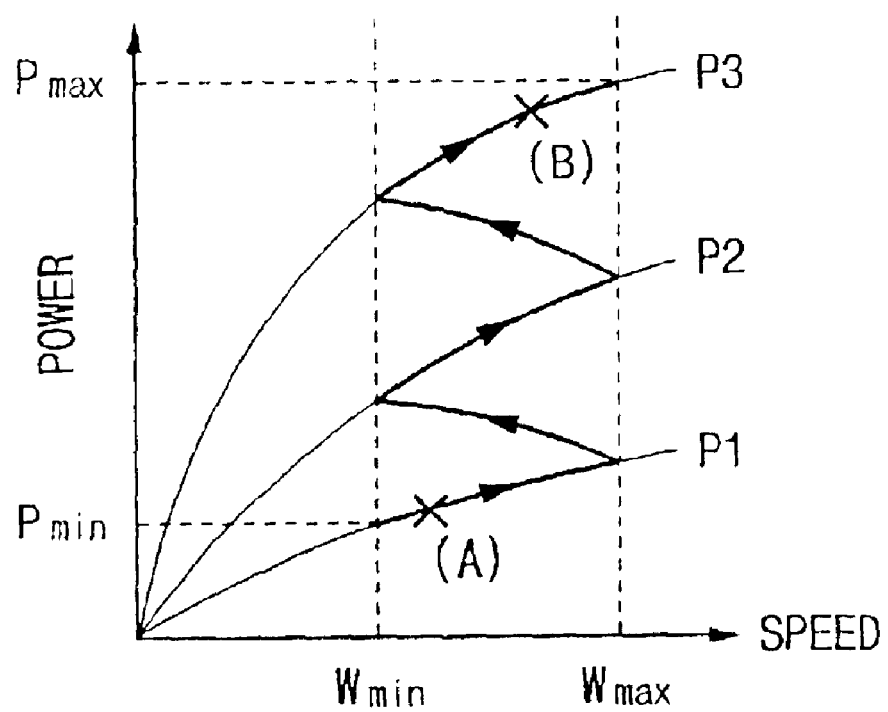
FIG. 4 is a graph illustrating an output power control signal-following algorithm for the auxiliary power control system of FIG. 1, according to a preferred embodiment of the present invention.

As shown, FIG. 3 is a graph illustrating rpm and output torque characteristics of a DC generator corresponding to different input voltages of the DC generator. The input voltages are related as: V1<V2<V3. The output torque of the DC generator 310 increases in proportion to the increase of the voltage at the same rpm.

The output power (torque x rpm) of the DC generator 310 can be expressed as a quadratic equation of the rpm. This is illustrated in FIG. 4, which is a graph showing an output power control signal-following algorithm for the auxiliary power control system, according to a preferred embodiment of the present invention. As shown, profiles P1, P2, and P3 show output power characteristics of the DC generator 310 when the voltages are V1, V2, and V3, respectively, in accordance with the rpm of the DC generator 310. The maximum rpm (Wmax) and minimum rpm (Wmin) are determined by the combustion-exhaust characteristics of the engine 300, and the maximum output power (Pmax) and minimum output power (Pmin) are determined based on the maximum and minimum rpm.

An algorithm for controlling the DC generator output and the engine rpm, according to a preferred embodiment, is shown in FIG. 6 as the locus represented by the darker line with arrows. This exemplary control function scheme demonstrates how the auxiliary power control system (and specifically, the APU controller) moves operation of the DC generator from operation point "A" to another operation point "B".

For example, when the operation point of the auxiliary power unit moves toward the right side of the graph, the APU controller 340 increases the throttle opening of the engine 300 while maintaining the input voltage level of the DC generator at a predetermined level, such that the rpm of the DC generator 310 increases, resulting in an increase of torque. If the rpm of the DC generator 310 reaches the maximum rpm (Wmax), the APU controller 340 increases the input voltage level of the DC generator 310 while maintaining the throttle opening of the engine 300 at a predetermined level, again resulting in a net increase in the output torque of the auxiliary power system.

Alternatively, if the operation point moves toward the left side of the graph shown in FIG. 6, the auxiliary power unit decreases the throttle opening of the engine 300 causing the rpm of the DC generator to decrease. If the rpm of the DC generator 310 reaches the predetermined minimum rpm (Wmin), the APU controller 340 increases the throttle opening of the engine 300 while maintaining the input voltage level of the DC generator 310, so as to increase the rpm of the DC generator, again resulting in an increase of the output torque of the auxiliary power system.

By repeatedly performing the above procedure, the operation point is converged back-and-forth to the final operation point "B."

As described above, in the auxiliary power control system according to a preferred embodiment of the present invention, a single-input, algorithmically-related output control mechanism is implemented as a substitute for the conventional multi-input multi-output (MIMO) control mechanism. This minimizes degradation caused by the combustion and exhaustion effects of the engine.

Also, the auxiliary power control system is capable of enhancing control stability, and of enabling control fine-tuning.

What is claimed is:

1. An auxiliary power control system for a series-type hybrid electric vehicle (SHEV), comprising:
   a DC generator driven by an engine for generating DC power;
   a DC/DC converter for converting the DC power generated by the DC generator to a voltage level;
   a generator control unit for controlling the voltage level of the DC generator;
   an engine control unit for controlling the engine; and
   an auxiliary power unit controller for outputting a voltage control signal to the generator control unit and a throttle control signal to the engine control unit such that the DC generator outputs a predetermined power;
   wherein the auxiliary power unit controller outputs the voltage control signal to increase an input voltage level of the DC generator, and the throttle control signal to maintain a throttle opening amount at a predetermined amount, when an rpm of the DC generator reaches a predetermined maximum rpm (Wmax), thereby increasing the DC generator output.

2. An auxiliary power control system for a series-type hybrid electric vehicle (SHEV), comprising:
   a DC generator driven by an engine for generating DC power;
   a DC/DC converter for converting the DC power generated by the DC generator to a voltage level;
   a generator control unit for controlling the voltage level of the DC generator;
   an engine control unit for controlling the engine; and
   an auxiliary power unit controller for outputting a voltage control signal to the generator control unit and a throttle control signal to the engine control unit such that the DC generator outputs a predetermined power;
   wherein the auxiliary power unit controller outputs the voltage control signal to maintain the input voltage level of the DC generator, and the throttle control signal to increase the throttle opening amount of the engine when the rpm of the DC generator reaches a predetermined minimum rpm (Wmin), thereby increasing the rpm of the DC generator.

3. A method of controlling an auxiliary power system for a hybrid electric vehicle (HEV) to change from a first operational state to a second operational state, the HEV having an engine and a DC generator, the method comprising:
   (a) generating a first throttle control signal to increase a throttle opening the engine;
   (b) generating a first voltage control signal to maintain an input voltage level of the DC generator;
   (c) when a maximum rpm is reached, generating a second voltage control signal to increase the input voltage level of the DC generator, and a second throttle control signal to maintain the throttle opening of the engine at a first predetermined amount;
   (d) when the DC generator outputs a predetermined voltage, generating third throttle control signal to decrease the throttle opening of the engine, and a third voltage control signal to maintain the input voltage level of the DC generator;
   (e) when a minimum rpm is reached, generating a fourth throttle control signal to increase the throttle opening of the engine to a second predetermined amount, and a fourth voltage control signal to maintain the input voltage level of the DC generator; and
   (f) repeating a subset of steps (a)–(e) until the second operational state, comprising a predetermined rpm and a predetermined power output, is reached.

* * * * *